June 17, 1924.

S. O. HULETT 1,498,278

DIFFERENTIAL

Filed Feb. 14, 1923

S. O. Hulett
INVENTOR

BY Victor J. Evans
ATTORNEY

June 17, 1924.

S. O. HULETT

DIFFERENTIAL

Filed Feb. 14, 1923

S. O. Hulett
INVENTOR

BY Victor J. Evans
ATTORNEY

Patented June 17, 1924.

1,498,278

UNITED STATES PATENT OFFICE.

SNOE O. HULETT, OF CORRY, PENNSYLVANIA.

DIFFERENTIAL.

Application filed February 14, 1923. Serial No. 618,960.

*To all whom it may concern:*

Be it known that I, SNOE O. HULETT, a citizen of the United States, residing at Corry, in the county of Erie and State of Pennsylvania, have invented new and useful Improvements in Differentials, of which the following is a specification.

This invention relates to differentials, and more particularly to differentials particularly adapted for use in connection with automobiles.

One of the main objects of the invention is to provide a differential of simple and efficient construction which is of compact construction and occupies but little space, and is well adapted to be applied to the Ford automobile without necessitating any changes in construction of the differential casing or housing. A further object is to provide a differential which is simple and automatic in its action and can be quickly and easily applied. Further objects will appear from the detailed description.

In the drawings:—

Figures 1, 2:
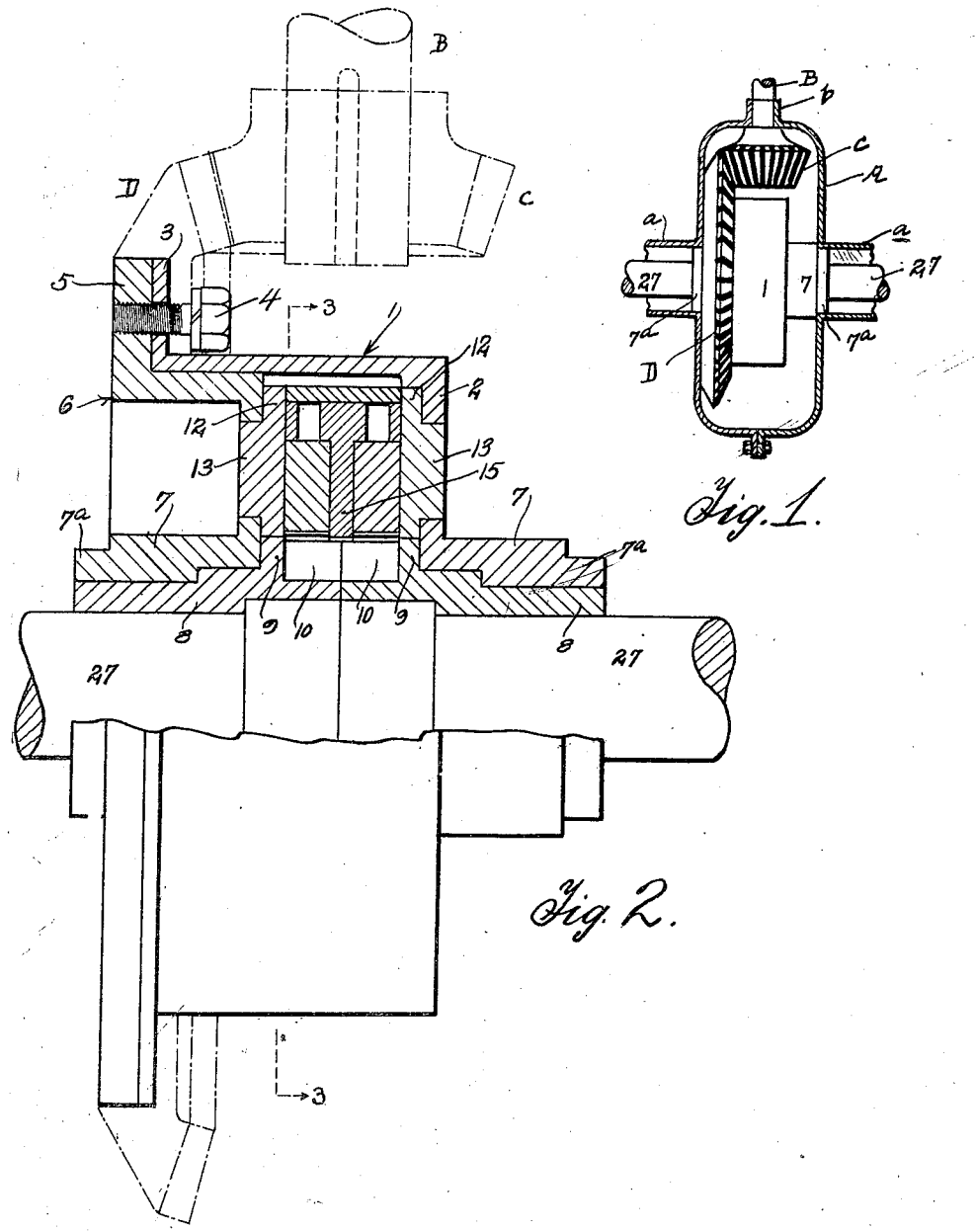
Figure 1 is a fragmentary plan view, partly in section, showing the differential as applied.
Figure 2 is a plan view, partly broken away, of the differential.

This invention is intended more particularly as an improvement over the differentials disclosed in my U. S. applications for differential, filed October 11, 1921, Serial Number 506,966 and October 23, 1922, Serial Number 596,413; and the primary object is to simplify the construction and produce a differential which occupies but very little space and may be readily applied to the Ford automobile.

The differential includes a cylindrical casing 1 which is closed at one end by a head 2. At its other end this casing is provided with an outer annular flange 3 which is secured, by means of screw bolts 4, or in any other suitable or preferred manner, to a flange 5 of an end plate 6 of channel cross-section which fits snugly into the end of casing 1. Bearing sleeves 7 have their inner ends seated in annular channels provided in head 2 and plate 6, these sleeves being provided, at their outer ends, with reduced necks 7ᵃ which fit into the ends of rear axle housings $a$ which extend from differential casing or housing A of an automobile, this casing or housing being provided with a sleeve $b$ which provides a bearing for drive shaft B of the automobile. A bevel pinion C is secured on shaft B and meshes with a bevel gear ring D which is secured by screw bolts 4 to flanges 3 and 5 of casing 1 and plate 6, respectively. This provides simple and efficient means for rotatably supporting casing 1 within differential housing A and for rotating the casing.

Figure 3:
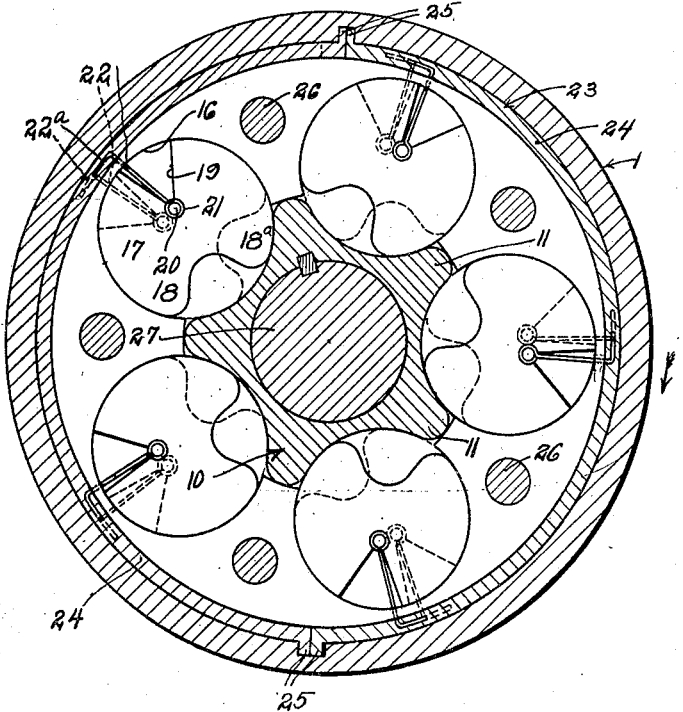
Figure 3 is a section taken substantially on line 3—3 of Fig. 2.
Figure 4:
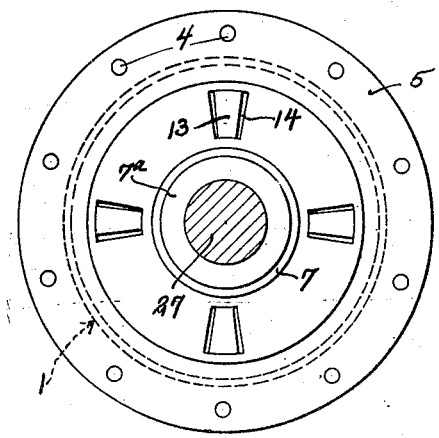
Figure 4 is an end view of the differential.

Sleeves 8 are rotatably mounted in sleeves 7, and each sleeve 8 is provided, at its inner end, with an annular shoulder 9 which is shaped to provide a star wheel 10 having a plurality of points or projections 11. A drive ring 12 is mounted within casing 1 about each of the shoulders 9 and is provided, on its outer face, with segmental lugs 13, these lugs projecting through openings 14 provided in plate 6 and head 2 of the casing, these openings being of greater length circumferentially of the casing than the lugs so as to permit independent turning movement of the casing about the drive rings through a predetermined distance, for a purpose to be described. A transmission ring 15 is mounted within the casing 1 between rings 12 and is provided, in its opposite faces, with a plurality of recesses 16 which snugly receive mutilated discs 17 each of which is cut to provide two fingers or points 18 and 18ᵃ adapted for contact with the points or projections 11 of the adjacent star wheel 10. Each disc is further cut to provide an outwardly flaring slot 19 and a cylindrical recess 20 at the inner end of this slot. Recess 20 receives a tubular element 21 formed at the inner end of a leaf spring 22 which extends through slot 19, the outer end portion 22ᵃ of this spring being bent at right angles and fitting into a corresponding recess provided in a shifting ring 23. This shifting ring is formed of two semi-circular sections 24 disposed end to end which are provided at their ends with outwardly projecting lugs 25 which fit snugly into corresponding grooves provided in the inner face of casing 1 so that ring 24, in effect, forms a part of casing 1 and rotates therewith. The drive rings 12 and transmission ring 15 are secured together by pins 26, or in any other suitable or preferred manner, so as to form, in effect, a unit. When casing 1 is rotated in a clockwise direction, as considered in Figures 3 and 4, the casing will first turn a short distance about rings 12, after which the plate 6 and head 2 of casing 1 will contact with lugs 13 so as to rotate rings 12 with the casing. When the casing 1 turns about rings 12 shifting ring 24 is turned with the casing so as to turn discs 17, by means of springs 22, into such position as to project fingers or points 18ᵃ of these discs, these fingers of the discs contacting with the projections or arms 11 of star wheels 10 thus causing the star wheels to rotate with disc 15 and consequently with casing 1. Sleeves 8 receive axles 27 which are keyed in these sleeves so that by rotating star wheels 10 the axles 27 are caused to rotate with casing 1. By reversing the direction of rotation of casing 1 this casing and ring 24 are turned about rings 13 and 15 a short distance so as to reverse the positions of discs 17, projecting fingers or points 18 of the discs and retracting fingers or points 18ᵃ, after which lugs 13 contact with the head 2 and plate 6 of the casing, star wheels 10 and the associated parts being rotated with the casing through the medium of discs 17 and ring 15 and associated parts. This provides very simple and efficient means whereby the direction of drive of the differential is automatically reversed. As will be noted more clearly from Figure 3, either of the star wheels 10 can rotate at higher speed than the other star wheel, as when making a turn, at which time the points or arms 11 of the star wheel will strike the projected points or fingers of discs 17 so as to force the same outwardly, these fingers or points of the discs being returned to operative position by the action of springs 22. This provides a very simple and highly efficient differential which is of compact construction and may be readily applied to the Ford automobile or any other automobile where it is desired to use a differential which occupies but very little space. In addition, the differential is of very simple construction and may be quickly assembled or disassembled.

While my differential is particularly well adapted for use in the Ford automobile, I do not in any way limit myself to this one use, since it can be equally well applied to many other automobiles of various types.

What I claim is:—

1. In a differential of the character described, a casing, sleeves rotatably mounted in the casing, a drive and transmission unit within the casing, means for establishing direct driving connections between said unit and the casing, said means permitting independent turning of the casing in either direction about the unit for a predetermined distance, and means actuated by the independent turning movement of the casing for establishing driving connections between said unit and the sleeves and for permitting rotation of the sleeves at different speeds.

2. In a differential of the character described, a cylindrical casing provided through its ends with circumferentially extending openings, a drive and transmission unit within the casing and provided with lugs projecting into and of less length than said openings whereby the casing has limited turning movement in either direction about said unit, sleeves rotatably mounted in the casing, and means actuated by the independent turning movement of the casing for establishing driving connections between said unit and the sleeves and for permitting rotation of the sleeves at different speeds.

3. In a differential of the character described, a cylindrical casing provided through its ends with circumferentially extending openings, sleeves rotatably mounted in the casing, a drive and transmission unit mounted within the casing about the sleeves and provided with lugs projecting into and of less length than said openings whereby the casing has limited turning movement in either direction about said unit, and means actuated by the independent turning movement of the casing for establishing driving connections between said unit and the sleeves and for permitting rotation of the sleeves at different speeds.

4. In a differential of the character described, a casing, sleeves mounted in the casing, drive rings mounted within the casing about said sleeves, a transmission ring mounted within the casing about the sleeves between the drive rings, means for establishing driving connections between said casing and the drive rings, said means permitting turning movement of the casing about the drive rings a predetermined distance in either direction, said transmission ring being connected to the drive rings for rotation therewith, means for establishing driving connections between said sleeves and the transmission ring, and means actuated by the turning movement of the casing about the drive rings for moving the means for establishing driving connections between the sleeves and the transmission ring into operative position and for reversing the direction of drive.

5. In a differential of the character described, a cylindrical casing provided through its ends with circumferentially extending openings, sleeves rotatably mounted in the casing, a drive and transmission unit mounted within the casing about the sleeves and provided with lugs projecting into and of less length than said openings whereby the casing has limited turning movement in either direction about said unit, and coacting means carried by the sleeves and said unit and actuated by the independent turning movement of the casing for establishing driving connections between said casing and the drive and transmission unit and for permitting rotation of the sleeves at different speeds.

6. In a differential of the character described, a casing, sleeves rotatably mounted in the casing, drive rings mounted within the casing, a transmission ring mounted within the casing, all of said rings being secured together to form a drive and transmission unit, means for establishing driving connections between said casing and the drive rings, said means permitting independent turning movement of the casing about the drive rings a predetermined distance in either direction, and means actuated by the independent movement of the casing for establishing driving connections between the transmission ring and said sleeves and for permitting the sleeves to rotate at different speeds.

7. In a differential of the character described, a casing, sleeves rotatably mounted in the casing and each provided at its inner end with a star wheel, a drive and transmission unit mounted in the casing about said star wheels, means for connecting said unit to the casing for rotation therewith and for permitting limited independent turning movement of the casing, members carried by said unit and adapted for engagement with the star wheels of the sleeves, and resilient means actuated by the independent turning movement of the casing for projecting said members and resiliently holding them in operative engagement with said star wheels.

8. In a differential of the character described, a casing, sleeves rotatably mounted in the casing and each provided at its inner end with a star wheel, a drive and transmission unit mounted in the casing about said star wheels, means for connecting said unit to the casing for rotation therewith and for permitting limited independent turning movement of the casing, members rockably mounted in recesses in said unit, said members fitting snugly into said recesses and being each provided with two oppositely directed elements disposed for engagement with the star wheels when said members are turned into their extreme positions in either direction, and resilient connections between said members and the casing for rocking said members into operating relation to the star wheels when the casing is turned about the drive and transmission unit, said connections acting to resiliently hold said members in operative position.

9. In a differential of the character described, a casing, sleeves rotatably mounted in the casing and each provided at its inner end with a star wheel, drive rings mounted in the casing about said sleeves, star wheels on the sleeves, a transmission ring mounted between the drive rings and about the star wheels, all of said rings being secured together and the transmission ring being provided in its opposite sides with recesses extending from the inner periphery thereof, discs rockably mounted in said recesses and fitting snugly therein, the inner portions of said discs being cut away to provide each disc with two spaced elements adapted for engagement with the star wheels, means for connecting the drive rings to the casing to turn therewith and for permitting independent turning movement of the casing in either direction through a predetermined distance, and resilient connections between the casing and said discs for rocking the latter in accordance with the independent turning movement of the former.

In testimony whereof I affix my signature.

SNOE O. HULETT.